INVENTOR.
EDWARD E. McCULLOUGH
BY Edwin D. Grant

ATTORNEY

INVENTOR.
EDWARD E. McCULLOUGH

BY Edwin D. Grant

ATTORNEY

United States Patent Office 3,451,310
Patented June 24, 1969

3,451,310
CAVITY-SHAPING MACHINE
Edward E. McCullough, Brigham City, Utah, assignor to Thiokol Chemical Corporation, Bristol, Pa., a corporation of Delaware
Filed Jan. 5, 1967, Ser. No. 607,533
Int. Cl. B23d 1/08
U.S. Cl. 90—43    1 Claim

ABSTRACT OF THE DISCLOSURE

A cutting machine wherein a cutter is mounted for movement toward and away from the longitudinal axis of a reciprocating drive shaft, the latter being rotatable about its own longitudinal axis.

---

This invention relates to a machine for shaping a cavity in a workpiece and more particularly to a machine for shaping the combustion cavity of a solid propellant rocket motor.

In the manufacture of solid propellant rocket motors having star-shaped or other non-cylindrical combustion cavities, it has been a general practice to place in a rocket motor casing a mandrel having the shape of the cavity to be formed and then to pour liquid propellant between this mandrel and the casing, the propellant then being cured to the solid state and the mandrel withdrawn thereafter. Although such mandrels are expensive to make, often they must be discarded after a preliminary test of the rocket motor formed therewith has proved its cavity design to be unsatisfactory. Furthermore, mandrels are sometimes difficult to remove from the propellant in which they are positioned, particularly when mandrels have a plurality of radially extending flanges thereon for forming star or other cavity shapes in propellant charges, and mandrels also are limited in application to propellant charges having combustion cavities of uniform cross-section or those in which the combustion cavity increases in diameter toward the end of the motor casing from which the mandrel must be removed.

Because of the aforementioned and other disadvantages associated with the forming of solid propellant combustion cavities by use of removable mandrels, such cavities have in the past also been formed by machining operations. Certain of the previously developed machines for this purpose have overcome the limitations inherent in the manufacture of rocket motors by use of mandrels, but most of these machines are complicated in design and thus expensive to construct, operate and maintain.

Accordingly, it is a broad object of this invention to provide an uncomplicated and thus inexpensive machine for shaping a combustion cavity in a solid propellant charge.

Another object of this invention is to provide a cavity-forming machine having uncomplicated and easily adjustable means for controlling the motion of the cutting tool thereof from a point remote from said cutting tool.

Still another object of this invention is to provide a machine by means of which radially extending recesses can be cut in the end of the combustion cavity of a solid propellant charge.

The invention will be more readily understood by consideration of the followong description of two embodiments thereof, in which description reference is made to the accompanying drawings wherein.

Throughout the specification and the drawings, like reference numbers designate like parts.

Figure 1:
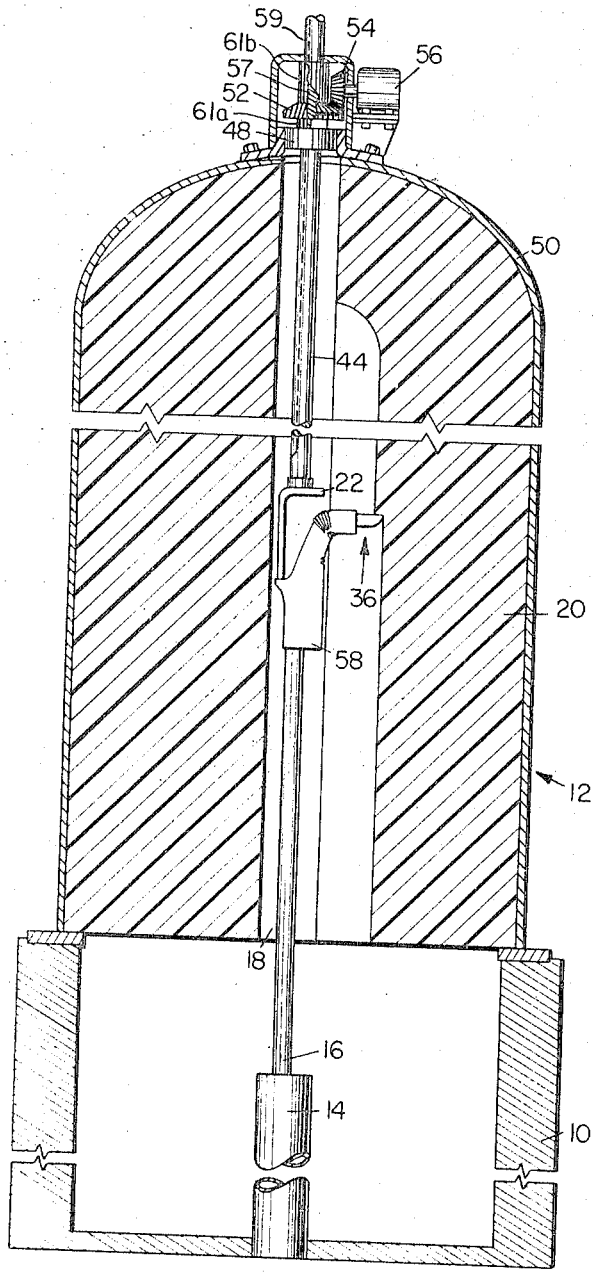
FIGURE 1 is a partially sectional side elevation of a preferred embodiment of the invention which is illustrated in use for shaping the combustion cavity of a solid propellant rocket motor.

As illustrated in FIGURE 1, a cavity-shaping machine in accordance with the invention comprises a base 10 the upper surface of which is adapted to support a rocket motor casing 12. During the operation of the machine, casing 12 is preferably fixedly secured to base 10 by conventional means such as bolts (not shown). Fixedly mounted on the bottom wall of base 10 is a double-acting hydraulic cylinder 14 having a drive shaft 16 adapted to extend over the complete length of a pre-formed cylindrical cavity 18 in a solid propellant grain 20 disposed within casing 12.

Figure 2:
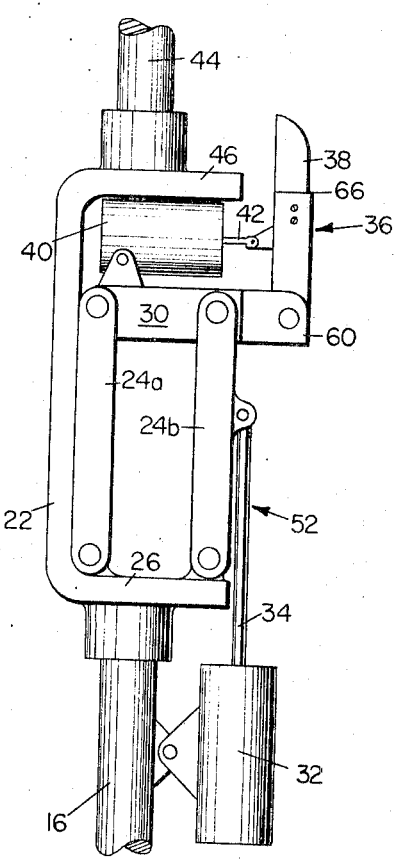
FIGURES 2 and 3 are detail views of components of the same embodiment.
Figure 3:
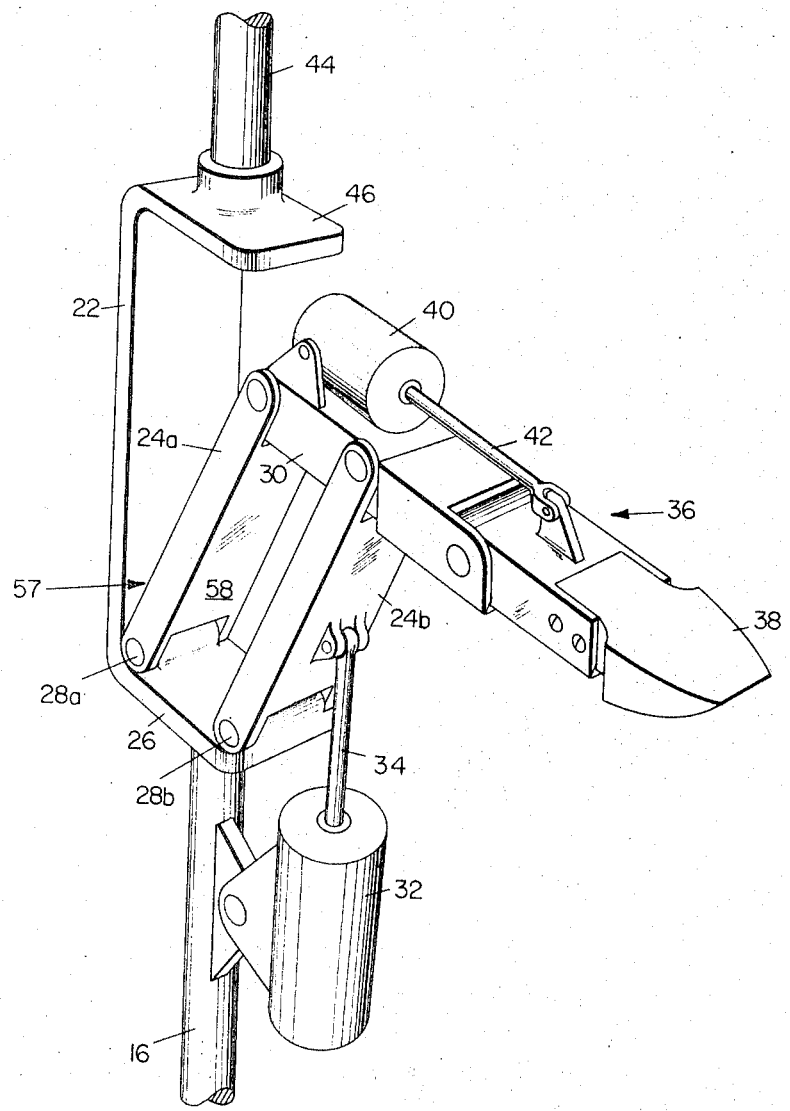

As illustrated in FIGURES 2 and 3, a U-shaped support member 22 is fixedly mounted on the upper end of drive shaft 16, and two links 24a, 24b are pivotally connected to the lower leg 26 of this support member. For convenience, the pivotal axes 28a, 28b (see FIGURE 3) of the connections between links 24a, 24b and support member 22 will be referred to hereinafter as the first pivotal axes of the links. These first pivotal axes of links 24a, 24b are parallel to each other and perpendicular to the longitudinal axis of drive shaft 16. The free ends (i.e., the ends not connected to support member 22) of links 24a, 24b are pivotally connected to a cutter support member 30, the axes of the pivotal connections between said links and cutter support member being parallel to the aforesaid first pivotal axes of said links. Furthermore, the spacing of the connections between the links and support member 22 and between the links and cutter support member 30 is such that the links are disposed in parallel relation to each other. Thus pivotal motion of links 24a, 24b relative to support member 22 moves cutter support member 30 in a direction perpendicular to the longitudinal axis of drive shaft 16. This pivotal motion of the links is effected by means of a double-acting hydraulic cylinder 32 pivotally mounted on drive shaft 16 adjacent support member 22 and comprising a drive shaft 34 the free end of which is pivotally connected to link 24b.

A cutter 36, comprising a removable end portion 38, is pivotally connected to the outer end of cutter support member 30, the pivotal axis of the connection between said cutter and cutter support member being parallel to the pivotal axes of the connections between links 24a, 24b and said cutter support member (and thus also parallel to the first pivotal axes 28a, 28b of said links). Pivotally mounted on cutter support member 30 is a double-acting hydraulic cylinder 40 the drive shaft 42 of which is pivotally connected to cutter 36. Thus cutter 36 can be moved between a first position wherein it is disposed parallel to the longitudinal axis of drive shaft 16, as illustrated in FIGURE 2, and a second position wherein it is disposed perpendicular to the longitudinal axis of said drive shaft, as illustrated in FIGURE 3.

In the preferred embodiment of the invention which is designed for use in shaping star-shaped combustion cavities in solid propellant grains of rocket motors, a guide shaft 44 is fixedly connected to the upper leg 46 of support member 22 and extends through a bushing 48 (see FIGURE 1) detachably mounted on the forward end closure 50 of casing 12. A gear 52 mounted on guide shaft 44 meshes with a drive gear 54 mounted on the drive shaft of an electric motor 56. An inwardly-extending tongue 57 on the gear 52 fits slidably in a long groove 59 (shown by a broken line in FIGURE 1) in the shaft 44. The gear 52 is also confined between spacing collars 61a and 61b to restrict its axial motion as the guide shaft 44 slides therethrough. Thus the angular position of guide shaft 44 (and drive shaft 16 and cutter 36 connected thereto) relative to casing 12 and grain 20 can be selected by operating motor 56.

The above-described preferred embodiment of the invention can be used to shape combustion cavities of many different configurations in solid propellant grains. To shape radially projecting, circumferentially extending slots in the wall of cavity 18 of the solid propellant grain 20, the removable end 38 of cutter 36 is provided with a cutting edge that is adapted to cut the grain as guide shaft 44 (and drive shaft 16 and cutter 36 connected thereto) is rotated by means of motor 56, the depth of the slots being controlled by actuation of hydraulic cylinder 32 to pivot links 24a, 24b and thereby move cutter support member 30 and cutter 36 any desired distance from the longitudinal axis of drive shaft 16. To shape a star-shaped combustion cavity (i.e., one having longitudinally extending recesses), hydraulic cylinder 14 is operated to reciprocate drive shaft 16 longitudinally of cavity 18. After each upward stroke of drive shaft 16, hydraulic cylinder 32 can be actuated to move cutter 36 closer to the wall of casing 12 and thereby increase the depth of the groove in grain 20 formed by said cutter. Obviously a recess of any desired depth and width can be formed by rotating guide shaft 44 and drive shaft 16 to align cutter 36 at different angular positions relative to casing 12 and by thereafter reciprocating drive shaft 16 by means of hydraulic cylinder 14 while controlling the position of cutter 36 relative to the longitudinal axis of said drive shaft by means of hydraulic cylinder 32. Furthermore, continuous helical recesses can be formed in the wall of cavity 18 by simultaneously rotating drive shaft 16 while moving it toward the forward end of casing 12. An additional advantage of the described apparatus is that hydraulic cylinder 42 can be actuated at the end of the upward stroke of drive shaft 16 to thereby form a curved dome or recess at the forward end of cavity 18 (as illustrated in FIGURE 1).

It is well-known that it is dangerous to allow pieces of solid propellant to become lodged between moving parts of any machinery used to shape or work solid propellant grains, because solid propellant can be ignited by heat generated by friction. Because of the compact arrangement of the cutter-positioning components of the preferred embodiment of the invention described hereinbefore, a flexible cover 58 (see FIGURE 1) can readily be fitted around the lower portion of support member 22, links 24a, 24b, hydraulic cylinders 32, 42, and a portion of cutter 36, thereby preventing the deposition of propellant particles around these moving parts.

Figure 4:
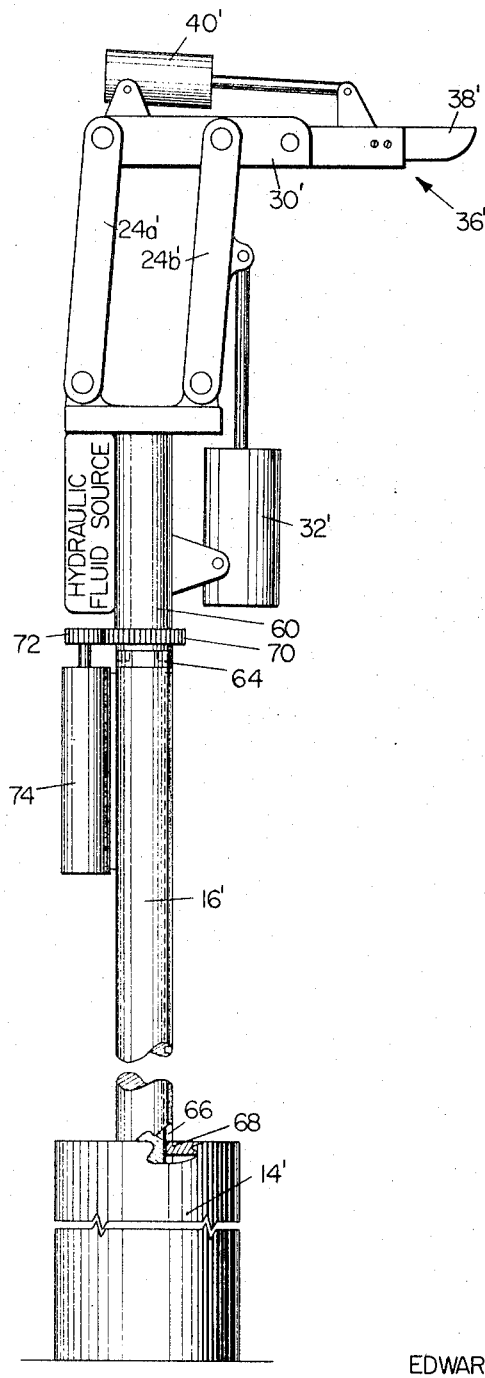
FIGURE 4 is a side elevation of a second embodiment of the invention.

In FIGURE 4 is illustrated a second embodiment of the invention that is similar to the aforedescribed preferred embodiment but differs therefrom in that it is modified to eliminate guide shaft 44 and the drive components positioned at the upper end thereof. Hence the second embodiment of the invention can advantageously be employed to shape the combustion cavity of a solid propellant rocket motor the casing of which does not have an igniter port at its forward end. As in the case of the preferred embodiment, a hydraulic cylinder 14' is provided for moving a drive shaft 16' along its longitudinal axis, the base to which said hydraulic cylinder is mounted not being shown so as to simplify the drawing. The upper portion 60 of drive shaft 16' is attached to the lower portion of the latter by means of a swivel joint 64 that permits said upper portion to be rotated about the longitudinal axis of said drive shaft. The lower portion of drive shaft 16' has a longitudinal groove 66 formed in the surface thereof, and slidably positioned in this groove is a tab 68 that projects from the edge of the aperture in hydraulic cylinder 14' through which said drive shaft extends. Thus tab 68 prevents rotation of drive shaft 16' relative to hydraulic cylinder 14'. Fixedly positioned on the upper portion 60 of drive shaft 16' is a gear 70 that meshes with a drive gear 72 mounted on the drive shaft of an electric motor 74, which in turn is fixedly attached to drive shaft 16'. Consequently, motor 74 can be operated to rotate the upper portion 60 of drive shaft 16' relative to the lower portion of the latter. The arrangement of links 24a', 24b', cutter support member 30', cutter 36' and hydraulic cylinders 32', 40' is identical to that of the same components in the preferred embodiment of the invention described hereinbefore.

It will be obvious from the foregoing description that the second embodiment of the invention is capable of performing the same cavity-shaping operations that have been mentioned in connection with the description of the operation of the first-described preferred embodiment of the invention. It will also be recognized that various modifications can be made in the arrangement of each of the embodiments without departing from the inventive concepts upon which their construction is based. For example, drive shafts 16, 16' may be reciprocated by mechanical drive means rather than by hydraulic cylinders, although for use of the machines in shaping the combustion cavities of solid propellant grains a hydraulic cylinder is preferable for this purpose since its drive mechanism is enclosed and thus not susceptible to being clogged by solid propellant particles that could be ignited by friction between the exposed moving parts of mechanical drive mechanisms. Therefore, it is to be understood that the scope of the invention is limited only by the terms of the appended claim.

What is claimed is:

1. Apparatus for enlarging and shaping a cavity in a workpiece, comprising:
   a base for supporting said workpiece;
   a drive shaft extending perpendicularly from said base and mounted for movement along, and for rotation about, its own longitudinal axis;
   means for reciprocating said drive shaft along its longitudinal axis;
   means for rotating said drive shaft about its longitudinal axis;
   a pair of links pivotally carried by said drive shaft and pivotable about first pivotal axes disposed substantially parallel to each other and perpendicular to the longitudinal axis of said drive shaft;
   a cutter support member to which the free ends of said links are pivotally connected, the axes of the pivotal connections between said cutter support member and said links being substantially parallel to said first pivotal axes of said links, said links being disposed in parallel relation to each other so that pivotal motion thereof moves said cutter support member in a direction perpendicular to the longitudinal axis of said drive shaft;
   means for pivoting at least one of said links relative to said drive shaft;
   a cutter pivotally connected to said cutter support member, the pivotal axis of said cutter being substantially parallel to the pivotal axes of said links; and
   means for pivoting said cutter relative to said cutter support member.

References Cited

UNITED STATES PATENTS

| 1,466,062 | 8/1923 | Rhodes | 90—43 |
| 2,392,536 | 1/1946 | Kline et al. | 90—43 |
| 2,771,820 | 9/1956 | Meyers et al. | 90—43 |

ANDREW R. JUHASZ, Primary Examiner.

G. WEIDENFELD, Assistant Examiner.

U.S. Cl. X.R.

77—58; 90—31